United States Patent Office 3,329,635
Patented July 4, 1967

3,329,635
WATER SOLUBLE CONDENSATION POLYMERS
Thomas J. Miranda, Granger, Ind., assignor to The O'Brien Corporation, South Bend, Ind., a corporation of Indiana
No Drawing. Filed Mar. 9, 1964, Ser. No. 350,552
19 Claims. (Cl. 260—22)

This invention relates to water-soluble polymers. More specifically, it relates to the preparation of specific acid intermediates suitable for the preparation of water-soluble polymers. Still more specifically, it relates to the production of such intermediates by the reaction of a specific type of polyol with specific dibasic acids, and subsequent reaction to produce the water-soluble polymer.

Recently several methods of producing water-soluble coating compositions have been introduced in the coating industry. In one case, linseed oil is air-blown and simultaneously emulsified. In another case, linseed oil is reacted with maleic anhydride, following which the adduct is neutralized with ammonia or other volatile base and dissolved in water with the aid of coupling solvents.

Still another attempt has been made by preparing an alkyd resin to give a product having a low acid number, and then adding and reacting a measured amount of phthalic anhydride to increase the acid number to between 50 and 100. In this case while the product is a water-soluble polymer the coating therefrom is water-sensitive and the film integrity is poor.

In accordance with the present invention, it has now been found that water-soluble polymers of desirable properties, both in the polymer and in the coatings produced therefrom can be made by reacting a polyol of the formula $Z(CH_2OH)_n$ wherein Z is an aliphatic hydrocarbon radical having 1–5 carbon atoms, and $n$ has a value of 3 or 4, with an anhydride of succinic, maleic, phthalic or tetrahydrophthalic acid. The resulting intermediate has an acid number corresponding to molecular weight of the intermediate since the anhydride produces one free acid radical and one esterified radical with a methylol group of the polyol.

In polyols of the formula given above, Z represents a saturated aliphatic radical of 1–5 carbon atoms. Typical polyols of this formula suitable for the practice of this invention include: trimethylol methane; the trimethylol ethanes, that is, 1,1,1- and 1,1,2-trimethylol ethanes; the trimethylol propanes, such as 1,1,1-, 1,1,2-, 1,1,3-, 1,2,2- and 1,2,3-trimethylol propanes; the trimethylol butanes, such as 1,1,1-, 1,1,2-, 1,1,3-, 1,2,2-, 1,2,3-, 1,2,4-, 1,1,4-, 2,2,3- and 2,2,4-trimethylol-n-butanes; tri-(beta-ethylol)-methane, 1,1,1-trimethylol-2-methyl propane, 1,1,2-trimethylol-2-methyl propane and 1,2,3-trimethylol-2-methyl propane; the trimethylol pentanes, such as 1,1,1-, 1,1,2-, 1,1,3-, 1,1,4-, 1,1,5-, 1,2,2-, 1,2,3-, 1,2,4-, 1,2,5-, 1,3,3-, 1,3,4-, 1,3,5- and 1,4,4-n-pentane; 1,1,1-, 1,1,2-, 1,2,3-, 1,3,3-, 1,3,4- and 1,4,4-trimethylol-2-methyl-butanes, 1,1-di(beta-ethylol)-1-methylol-propane, 1,1-di(beta-ethylol)-2-methylol-propane, 1,1,2-tri(beta-ethylol)ethane, tetramethylol methane, or pentaerythritol; the tetramethylol ethanes, such as 1,1,1,2-tetramethylol ethane and 1,1,2,2-tetramethylol ethane; the tetramethylol propanes, such as 1,1,1,2-, 1,1,1,3-, 1,1,2,2-, 1,1,2,3- and 1,2,2,3-tetramethylol propanes; the tetramethylol butanes, such as 1,1,1,2-, 1,1,1,3-, 1,1,1,4-, 1,1,2,2-, 1,1,3,3-, 1,1,2,3-, 1,2,2,3-, 1,2,3,4-, 2,2,3,4- and 2,2,3,3-tetramethylol butane, 2,2,2-tri(beta-ethylol)-ethanol, etc.; the teramethylol pentanes, such as 1,1,1,2-, 1,1,1,3-, 1,1,1,4-, 1,1,1,5-, 1,1,2,2-, 1,1,3,3-, 1,1,2,3-, 1,2,2,3-, 1,2,2,4-, 1,2,3,4-, 1,2,4,5-, 1,2,3,5-, 2,2,3,3-, 2,2,3,4-, 2,2,3,5-tetramethylol-n-pentane, tetra(beta-ethylol)methane, 1,2,4-trimethylol-3-beta-ethylol-n-butane, 2,2,3-tri-beta-ethylol-n-propanol, etc.

Particularly preferred polyols for reasons of availability and economy are 1,1,1-trimethylol ethane, 1,1,1-trimethylol propane, 1,1,1-trimethylol butane, 1,2,3-trimethylol propane and pentaerythritol (including dipentaerythritol).

The polyols used in the practice of this invention have only primary hydroxy groups which produce ester groups of improved water-resistance and stability.

The polyol acid anhydride adduct or intermediate of this invention is prepared by reacting one mole of the polyol with one mole of the acid anhydride upon heating for 1 to 3 hours. The formation of the adduct is checked by molecular weight and acid number determinations which should be approximately the same. Then a drying oily fatty acid, additional polyol and anhydride are added in amounts calculated to give the desired acid number in the range 50–65, preferably 55–62. The products of this invention with acid numbers in the recited range have suitable resistance to water, satisfactory viscosity and suitable water solubility for the production of coating compositions of desired properties in the compositions themselves and in the ultimate dried coating.

Various methods of practicing the invention are illustrated by the following examples. These examples are intended merely to illustrate the invention and not in any sense to limit the manner in which the invention can be practiced. The parts and percentages recited therein and all through the specification, unless specifically provided otherwise, are by weight.

Example I

To a flask equipped with stirrer, condenser, trap for azeotropic removal of water, inert gas feed and thermometer, are charged 49.6 parts 1,1,1-trimethylol propane, 36.8 parts succinic anhydride and 100 parts of toluene. The reaction mass is heated under a nitrogen atmosphere to 100° C. and maintained at that temperature for 60 minutes. A sample is withdrawn for acid number determination. The acid number corresponds to the molecular weight of the adduct, which indicates that one mole of anhydride was added to one hydroxy of the polyol to give one free acid group, one ester group and two hydroxy groups in the adduct.

To this intermediate, is added 110.5 parts of phthalic anhydride, 71 parts of 1,1,1-trimethylol ethane and 138.8 parts of dehydrated castor oil fatty acid. These proportions are calculated to give an acid number of approximately 55–60. The mixture is heated to 200–210° C. until 28 parts of water are collected in the separating trap. At this time the acid number is 54.6.

The reaction mixture is then cooled and poured into a mixture of 38.5 parts butyl Cellosolve, 115.5 parts n-propanol, 15.5 parts of 28% ammonium hydroxide, 14.2 parts of KOH and 542 parts of water. The resultant polymer solution has a solids content of 41.2%, a GH viscosity of U–V and a density of 8.62 pounds per gallon. The resin is thinned to 10% solids with water and deposited electrophoretically on steel to yield a tough, clear, water-resistant coating with good salt spray resistance.

Example II

An enamel is prepared from the resin solution (41.2% solids) of Example I by charging to a ball mill:

| | Parts |
|---|---|
| Resin solution of Example I | 295.5 |
| Titanium dioxide | 371 |
| Atomite (CaCO$_3$) | 62.6 |
| Butyl Cellosolve | 63.8 |
| Water | 63.8 |
| Bentone 27 (diatomaceous silica) | 4.7 |
| R&R 551 (soya bean lecithin) | 3.5 |

This mixture is ballmilled for 16 hours and the following ingredients added and stirred until homogeneous (about 20–30 minutes):

| | Parts |
|---|---|
| Resin of Example I | 293.5 |
| Butyl Cellosolve | 23.2 |
| Water | 23.2 |
| Pb drier | 2.0 |
| Co drier | 1.2 |
| Mn drier | 0.4 |

The resultant semi-gloss enamel has a solids content of 56.6%, a viscosity of 68 KU and a density of 11.52 pounds per gallon. This enamel has excellent brushing characteristics and is suitable for interior semi-gloss paints. Upon application the paint is tack-free in two hours and dries overnight to a tough, water-resistant film which can be recoated.

Example III

The procedure of Example I is repeated using initially:

| | Parts |
|---|---|
| 1,1,1-trimethylol propane | 35.2 |
| Succinic anhydride | 26.1 | and in the subsequent addition:

| | Parts |
|---|---|
| Phthalic anhydride | 110.5 |
| Trimethylol ethane | 71 |
| Dehydrated castor oil fatty acids | 138.8 |

The solution is refluxed until 19.9 parts of water have been separated from the azeotrope, at which time the acid number of the product is 54.6. Then the reaction mixture is poured into a mixture of 27.3 parts of butyl Cellosolve, 82 parts isopropanol, 11 parts of 28% ammonium hydroxide, 10.2 parts of KOH and 384 parts of water. The resultant solution has a solids content of 41%, a viscosity of U–V and a density of 8.62 pounds per gallon.

An enamel is prepared from this resin according to the procedure of Example II using 371 parts TiO$_2$, 292 parts of the resin, 62.6 parts atomite, 4.7 parts diatomaceous earth, and 3.5 parts of a defoamer (R and R551). After 16 hours in the pebble mill, there are added 292 additional parts of the same resin, 15.5 parts of butyl Cellosolve, 15.5 parts of water, 2 parts of lead naphthanoate drier (24%), 1.2 parts cobalt drier (6%), 0.4 part manganese drier (6%). The resulting product had a solids content of 57.5%, a K–U viscosity of 69 and a density of 11.61 pounds per gallon. When applied as a coating to white pine, the 60° gloss has a value of 59, and on birch the 60° gloss has a value of 53. The enamel has very good brushing characteristics and the resulting coating has good flexibility.

Example IV

The procedure of Example III is repeated using in the initial resin preparation 26.1 parts of succinic anhydride, 31.4 parts of trimethylol ethane; and in the second addition 110.5 parts of phthalic anhydride, 71 parts of trimethylol ethane and 138.8 parts of dehydrated castor oil. This product has an acid number of 59. In the neutralization, there are used 27.3 parts of butyl Cellosolve, 82 parts of isopropanol, 11 parts of 28% ammonium hydroxide, 10.2 parts of KOH and 384 parts of water. The product after neutralization has a solids content of 40.9, a viscosity of V–W and a density of 8.60 pounds per gallon.

In preparing the enamel, there are used 293.5 parts of the resin, 371 parts of TiO$_2$, 62.6 parts of atomite, 4.7 parts of bentone 27, 3.5 parts of R and R551, 63.8 parts of butyl Cellosolve and 63.8 parts of water. After pebblemilling for 16 hours there are added an additional 293.5 parts of the resin, 2 parts of lead naphthanoate drier (24%), 1.2 parts of cobalt drier (6%), 0.4 part of manganese drier (6%), 23.2 parts of butyl Cellosolve and 23.2 parts of water. This product has a non-volatile content of 56.6%, a KU viscosity of 68, a density of 11.52 pounds per gallon. Upon application of the coating on white pine, the 60° gloss test shows a value of 44, and on birch, the 60° gloss test shows a value of 47. The brushing characteristics are very good and the coating has good flexibility.

Example V

The procedures of Examples I and II are repeated using the following ingredients:

| | Parts |
|---|---|
| Succinic anhydride | 26.1 |
| and | |
| Pentaerythritol (to form the intermediate adduct) | 35.6 |
| and | |
| Phthalic anhydride | 110.5 |
| Trimethylol ethane | 71 |
| Dehydrated castor oil to give a resin having an acid number of 48.3 | 138.8 |

This product is neutralized with:

| | Parts |
|---|---|
| Butyl Cellosolve | 54.6 |
| Isopropanol | 54.6 |
| KOH | 20.9 |
| Triethyl amine | 3.6 |
| and | |
| Water | 426 |

In the enamel preparation, there are used 294 parts of the resin, 371 parts of TiO$_2$, 62.6 atomite, 4.7 parts of bentone 27, 3.5 parts of R and R551, 63.8 parts of butyl Cellosolve and 63.8 parts of water. After the 16 hours of pebblemilling, there are added an additional 294 parts of the resin, 7.9 parts of butyl Cellosolve, 7.9 parts of water, 2.0 parts of lead naphthanate drier, 2.0 parts of cobalt drier and 0.4 part of manganese drier. The resulting enamel has a non-volatile content of 58.2%, a K–U viscosity of 70 and a density of 11.75 pounds per gallon. Upon application as a coating on white pine, the 60° gloss test shows a value of 39 and on birch, the 60° gloss test shows a value of 40. The brushing characteristics are very good and the coating has good flexibility.

Example VI

The procedures of Examples I and II are repeated using the following ingredients in the preparation of the intermediate adduct:

| | Parts |
|---|---|
| Trimethyl ethane | 22 |
| Phthalic anhydride | 27 |
| Toluene | 50 | and in the second addition:

| | Parts |
|---|---|
| Phthalic anhydride | 77.75 |
| Trimethylol ethane | 50 |
| Adduct | 49 |
| Dehydrated castor oil fatty acids | 97.9 |

In preparing the adduct above, the preliminary mixture is heated at 108–116° for about 60 minutes, at which time the drying oil acids, the anhydrides and the polyol are added. The temperature is then raised to 172° and continued at reflux while water is being separated from the azeotrope until the reflux temperature reaches 210° C. and 12 parts of water have been separated.

The acid number at this point is 58, and 64.35 parts of butyl Cellosolve are added to give a solution having a viscosity of Q and a solids content of 40.8%. When converted to a water soluble enamel as in Example II, similar results are obtained.

Example VII

The procedures of Examples I and II are repeated using the following ingredients for the adduct:

| | Parts |
|---|---|
| 1,1,1-trimethylol propane | 49.4 |
| Maleic anhydride | 36.1 |
| Toluene | 100 |

After heating under nitrogen at 105°–108° C. for 60 minutes, the following are added:

| | Parts |
|---|---|
| Phthalic anhydride | 155.5 |
| Trimethylol ethane | 100 |
| Dehydrated castor oil fatty acids | 195.3 |

This mixture is heated under reflux until 28 parts of water are separated which takes an additional heating period of approximately 130 minutes. Then this product is added to a mixture of

| | Parts |
|---|---|
| Butyl Cellosolve | 79.8 |
| Carbitol | 23.9 |
| n-Propanol | 65.8 |
| Triethyl amine | 34.6 |
| KOH | 11.6 |
| Water | 535 |

When tested as a coating composition as in Example II, similar results are obtained.

Example VIII

The procedures of Examples I and II are repeated using 49.4 parts of 1,1,1-trimethylol propane, 56 parts of tetrahydrophthalic anhydride and 75 parts of toluene for preparation of the adduct. After heating this mixture under nitrogen for about 60 minutes at 107° C. the adduct is mixed with 155.5 parts of phthalic anhydride, 105 parts 1,1,1-trimethylol ethane, 195.3 parts dehydrated castor oil fatty acid and 50 parts toluene. After azeotropic refluxing is continued for an additional 160 minutes with reflux temperature ranging from 197–205° C., a total of 29 parts of water are thereby removed and the product has an acid number of 58. This product is added to a mixture of 84.5 parts butyl Cellosolve, 25.3 parts Carbitol, 69.5 parts n-propanol, 34.6 parts triethylamine, 11.6 parts KOH and 560 parts water. The resultant product has a viscosity of U, a non-volatile content of 39.1% and a density of 8.61 pounds per gallon. When tested as a coating composition as in Example II, very good results are obtained.

Example IX

Similar results are obtained when the procedures of Examples I–VII are repeated using in place of the dehydrated castor oil fatty acid, equivalent amounts of linseed oil fatty acid, oiticica oil fatty acid, tung oil fatty acid, soybean oil fatty acid, perilla oil fatty acid and a 50–50 mixture of fatty acids from tall oil and linseed oil.

Example X

Similar results are obtained when the procedures of Examples I–VIII are repeated using in place of the polyols of those examples, equivalent amounts of 1,2,3-trimethylol propane, 1,1,1-trimethylol butane, 1,1,1-trimethylol-2-methyl-butane.

The drying oil fatty acids which are useful in the practice of this invention are the fatty acids derived from dehydrated castor oil, linseed oil, oiticica oil, soybean oil, tung oil, hempseed oil, perilla, rape seed oil, corn oil, cottonseed oil and tall oil. These can be used individually or in admixture with each other. Some of those which have poorer drying properties such as tall oil, are advantageously used in combination with others of the group which are better drying oils.

In preparing water-soluble polymers according to the practice of this invention, the proportions of drying oil and additional polyol and anhydride to be added to the intermediate adduct are determined by the particular properties desired in the ultimate polymer. The proportions are selected to give a predetermined molecular weight, acid number, flexibility of final film, adhesive characteristics and water resistance. Selection is also based on functionality to prevent gelation. When a tetrahydric polyol is used more of the drying oil fatty acid is used to esterify the extra hydroxy groups and thereby reduce cross linking by inter-reaction with the acid groups from the anhydride.

The preferred proportions are one mole of drying oil fatty acid, one mole of polyol and two moles of anhydride. This preferred proportion gives a polymer structure having the formula:

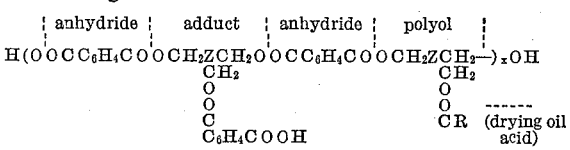

wherein R is the unsaturated hydrocarbon portion of the drying oil fatty acid and $x$ is an integer of at least 2, preferably at least 4.

As the proportions of drying oil acid and additional anhydride and polyol are varied, the above formula will vary accordingly although certain sections of the polymer chain will still have this structure. In order to have the improved polymers of this invention, it is desirable to have the proportions within the range of one-half mole of drying oil fatty acid, one-half mole of polyol and 1.5 moles of anhydride per mole of adduct up to 1.5 moles of drying oil fatty acid, 1.5 moles of polyol and 2.5 moles of anhydride per mole of adduct.

It is desirable in effecting the various reactions of this invention that they are conducted under a blanket or atmosphere of inert gas, such as nitrogen, argon, etc. While the examples show the preparation of the enamels by grinding the components in a ball mill, any equivalent method of grinding and mixing can be used. For example, a sand mill which is presently used in the art, as described in U.S. Patents 2,581,414 and 2,855,156, and various other devices can be substituted for the ball mill. For example, very satisfactory results are obtained in accordance with the above examples using a rate of grinding in a sand mill of 4 to 6.5 gallons per hour of the various mixtures.

As indicated in the examples various modifiers can be used in the compositions of this invention such as leveling agents, e.g. mineral spirits, glycol ethers, glycol esters, silicones, etc.; floating agents, such as cationic surfactants, stearates, soya bean lecithin, silicones, etc.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. The process for the preparation of a water-soluble composition suitable for coating comprising the steps of:
   (a) reacting a polyol of the formula $Z(CH_2OH)_n$ wherein Z is an aliphatic hydrocarbon radical having no more than 5 carbon atoms and $n$ is an integer having a value of at least 3 and no more than 4, with an anhydride selected from the class consisting of succinic, maleic, phthalic and tetrahydrophthalic anhydrides in substantially mole per mole portions of said polyol and said anhydride thereby to produce an adduct having 1 ester group and 1 free acid group from said anhydride;
   (b) thereafter reacting said adduct with proportions of a polyol of the formula $Z(CH_2OH)_n$ as defined above, and an anhydride as defined above and a drying oil fatty acid selected from the class consisting of dehydrated castor oil fatty acid, linseed oil fatty acid, oiticica oil fatty acid, chinawood oil fatty acid, soybean oil fatty acid and tall oil fatty acid, said polyol, said acid anhydride and said drying oil fatty acid of reaction (b) being used in proportions of 0.5–1.5 moles, 1.5–2.5 moles and 0.5–1.5 moles respectively per mole of said adduct and distilling water from the reaction mass until the reaction product has an acid number in the range of 50–65.

2. The process of claim 1 in which said reaction (b) is conducted to obtain an acid number of 55–62.

3. The process of claim 1 in which said polyol of reaction (a) is a trimethylol propane.

4. The process of claim 3 in which said trimethylol propane is 1,1,1-trimethylol propane.

5. The process of claim 1 in which said polyol of reaction (a) is a trimethylol ethane.

6. The process of claim 5 in which said trimethylol ethane is 1,1,1-trimethylol ethane.

7. The process of claim 1 in which said polyol is pentaerythritol.

8. The process of claim 1 in which said drying oil fatty acid is dehydrated castor oil fatty acid.

9. The process of claim 1 in which said drying oil fatty acid is linseed oil fatty acid.

10. The process of claim 1 in which said drying oil fatty acid is oiticica oil fatty acid.

11. The process of claim 1 in which said polyol, said anhydride and said drying oil fatty acid are reacted with said adduct in proportions of 1 mole, 2 moles and 1 mole respectively per mole of adduct.

12. The process of claim 1 in which said polyol of step (a) is trimethylol propane, said anhydride of step (a) is succinic anhydride, said polyol of step (b) is trimethylol ethane, and said anhydride of step (b) is phthalic anhydride.

13. The process of claim 12 in which drying oil fatty acid is dehydrated castor oil fatty acid.

14. The process of claim 1 in which said polyol and said anhydride of step (a) are trimethylol ethane and succinic anhydride respectively and said polyol and said anhydride of step (b) are trimethylol ethane and phthalic anhydride respectively.

15. The process of claim 14 in which said drying oil fatty acid is dehydrated castor oil fatty acid.

16. The process of claim 1 in which said polyol and said anhydride of step (a) are pentaerythritol and succinic anhydride respectively and said polyol and said anhydride of step (b) are trimethylol ethane and phthalic anhydride respectively.

17. The process of claim 16 in which said drying oil fatty acid is dehydrated castor oil fatty acid.

18. The process of claim 1 in which said polyol and said anhydride of step (a) are trimethylol propane and maleic anhydride respectively, and said polyol and said anhydride of step (b) are trimethylol ethane and phthalic anhydride respectively.

19. The process of claim 18 in which said drying oil fatty acid is dehydrated castor oil fatty acid.

References Cited

UNITED STATES PATENTS

| | | | |
|---|---|---|---|
| 2,008,417 | 7/1935 | Groff | 260—22 |
| 2,528,946 | 11/1950 | Coffey et al. | 260—22 |
| 2,655,486 | 10/1953 | Keyl et al. | 260—22 |
| 2,904,533 | 9/1959 | Carlston et al. | 260—75 |
| 2,973,331 | 2/1961 | Kraft | 260—22 |
| 3,057,824 | 10/1962 | Le Bras et al. | 260—22 |
| 3,109,832 | 11/1963 | Seiner | 260—75 |
| 3,127,376 | 3/1964 | Lindenauer et al. | 260—22 |
| 3,268,483 | 8/1966 | Klootwijk et al. | 260—22 |

DONALD E. CZAJA, *Primary Examiner.*

LEON J. BERCOVITZ, *Examiner.*

R. W. GRIFFIN, *Assistant Examiner.*